United States Patent [19]
Miller et al.

[11] Patent Number: 6,095,736
[45] Date of Patent: Aug. 1, 2000

[54] SELF-CONTAINED FASTENER DEVICE

[75] Inventors: Richard Virgil Miller, North Richland Hill; Nicholas Earle Miller; Roger Kent Miller, Jr., both of Bedford, all of Tex.

[73] Assignee: Nissi Industrial Technology, Inc., Forth Worth, Tex.

[21] Appl. No.: 08/959,569

[22] Filed: Oct. 28, 1997

Related U.S. Application Data

[60] Provisional application No. 60/030,217, Nov. 7, 1996.

[51] Int. Cl.⁷ ...................................................... F16B 21/18
[52] U.S. Cl. .......................... 411/352; 411/384; 411/107; 411/999
[58] Field of Search .................................... 411/352, 353, 411/389, 383, 384, 410, 107, 970, 412, 413, 999

[56] References Cited

U.S. PATENT DOCUMENTS

| | | | |
|---|---|---|---|
| 2,376,089 | 5/1945 | Savageau | 411/999 |
| 2,639,179 | 5/1953 | Phelps | 411/999 |
| 2,919,736 | 1/1960 | Kann | 151/69 |
| 2,992,685 | 7/1961 | Madsen | 170/159 |
| 3,124,190 | 3/1964 | Cornell | 151/69 |
| 3,424,212 | 1/1969 | Kemper | 411/410 |
| 3,578,799 | 5/1971 | Davis | 269/51 |
| 3,683,988 | 8/1972 | Carter et al. | 151/6 |
| 4,846,622 | 7/1989 | Lien | 411/366 |
| 4,915,557 | 4/1990 | Stafford | 411/107 |
| 4,934,888 | 6/1990 | Corsmeier et al. | 411/353 |

OTHER PUBLICATIONS

Vought drawing, date unknown.
Boeing drawing "Back–Bolt Assembly," Dec. 13, 1993.
Vought Aircraft CompaNy drawing, Jan. 4, 1994.

*Primary Examiner*—Darnell M. Boucher
*Assistant Examiner*—Clifford B Vaterlaus
*Attorney, Agent, or Firm*—Max Ciccarelli

[57] ABSTRACT

A small, compact, self-contained fastener. The fastener has a cylindrical housing of which one of the embodiments has threads located on its exterior for releasably securing the housing to a one of the two objects being fastened. Inside the housing is located a cooperating member which extends in the axial direction of the housing. The cooperating member is movable between an engaged position in which the cooperating member engages the second object and a dis-engaged position in which the cooperating member does not engage the second object. The cooperating member has a cooperating member stop shoulder opposed to the housing stop shoulder and adapted to mate with the housing stop shoulder when the cooperating member is in the engaged position. When the cooperating member is in the engaged position, the cooperating member can retain the second object at a selected position with respect to the first object. The second object can be released by moving the cooperating member from the engaged to the dis-engaged position.

5 Claims, 6 Drawing Sheets

SELF-CONTAINED FASTENER DEVICE

This application claims the benefit of U.S. Provisional Application No. 60/030,217, accorded a filing date of Nov. 7, 1996, which is hereby incorporated by reference.

BACKGROUND OF THE INVENTION

1. Field of the Invention

This invention relates in general to fastener devices and in particular to a self-contained fastener device which can releasably fasten itself to one of the two components being fastened and which can releasably fasten the two components together.

2. Description of the Prior Art

In many diverse fastening operations in which two components are being secured one to the other, it is desirable to have a fastener device which can be releasably secured to one of the two components, and which can releasably secure the two components one to the other. U.S. Pat. Nos. 2,992,685 (Madsen), 3,124,190 (Cornell), 3,578,799 (Davis), and 3,683,988 (Carter) show some of the existing fasteners of this type and some of the common applications.

Although there exist fasteners of this type that are self-contained—in other words whose component parts are retained together upon unfastening—such existing fasteners are generally bulky and unduly complicated. Smaller, more compact fasteners are desirable for applications in which space is limited. Also, simple fasteners with fewer parts are usually more reliable.

Also, the existing fasteners of this general type must be driven (such as by a wrench) from one particular side of the fastener, which severely limits the range of applications.

SUMMARY OF THE INVENTION

It is the general object of the invention to provide a smaller, more compact self-contained fastener capable of releasably securing itself to one of the two components and capable of releasably securing the two components together. It is also an object of the invention to provide such a self-contained fastener which can be driven from both sides of the fastener.

The present invention provides a fastener device with a cylindrical housing, an embodiment of which has threads located on its exterior for releasably securing the housing to a one of the two objects being fastened. Inside the housing is located a cooperating member which extends in the axial direction of the housing. The cooperating member is movable between an engaged position in which the cooperating member engages the second object and a dis-engaged position in which the cooperating member does not engage the second object. The cooperating member has a cooperating member stop shoulder opposed to the housing stop shoulder and adapted to mate with the housing stop shoulder when the cooperating member is in the engaged position. When the cooperating member is in the engaged position, the cooperating member can retain the second object at a selected position with respect to the first object. The second object can be released by moving the cooperating member from the engaged to the dis-engaged position.

The above as well as additional objects, features, and advantages will become apparent in the following description.

DETAILED DESCRIPTION OF THE INVENTION

Figure 1:
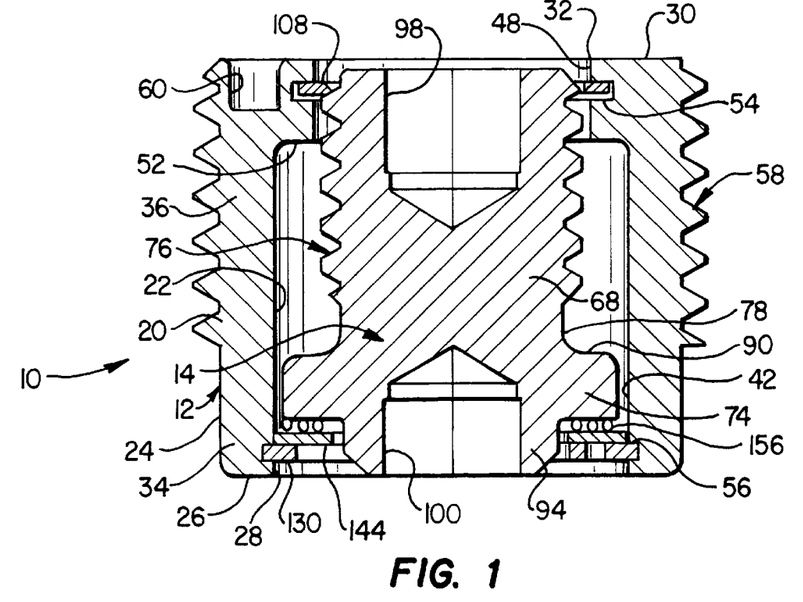
FIG. 1 is a cross-sectional view of the apparatus of the present invention shown in the dis-engaged position.
Figure 2:
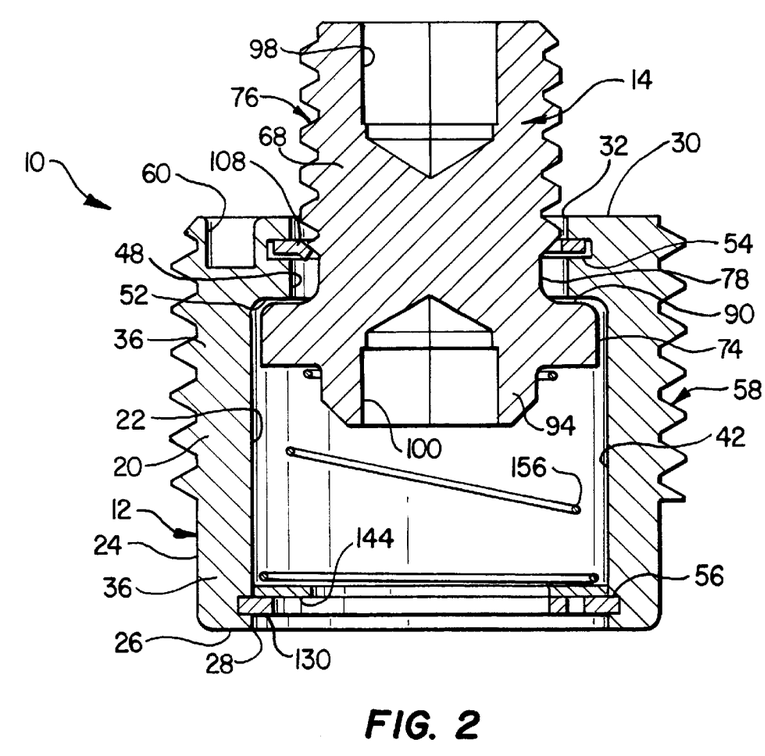
FIG. 2 is a cross-sectional view of the apparatus of the present invention shown in the engaged position.

Referring first to FIGS. 1 and 2, the preferred embodiment of the fastener 10 of the present invention is shown. A housing 12 houses a cooperating member, or stud, 14. Stud 14 extends in the axial direction of housing 12, and is movable between a dis-engaged position shown in FIG. 1 and an engaged position shown in FIG. 2.

Figure 3:
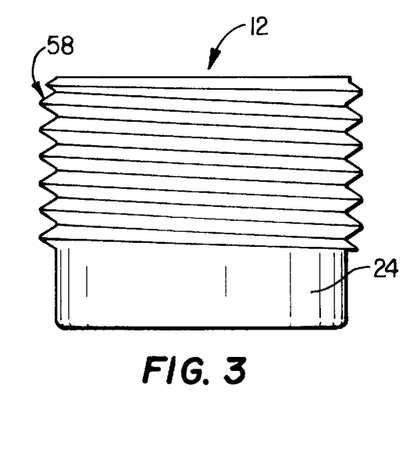
FIG. 3 is a side view of the housing of the apparatus of FIG. 1.
Figure 4:
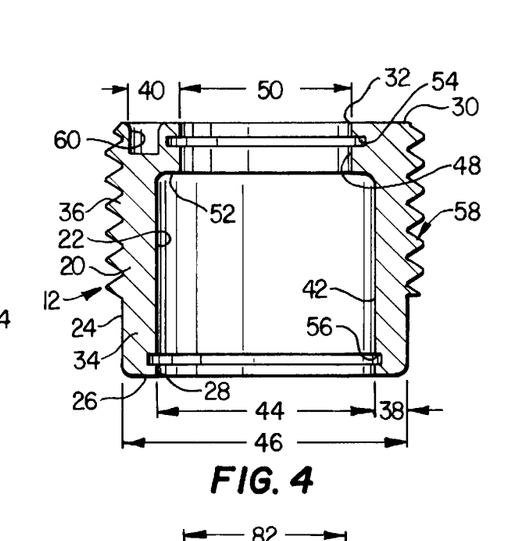
FIG. 4 is a cross-sectional view of the housing of FIG. 1.
Figure 5:
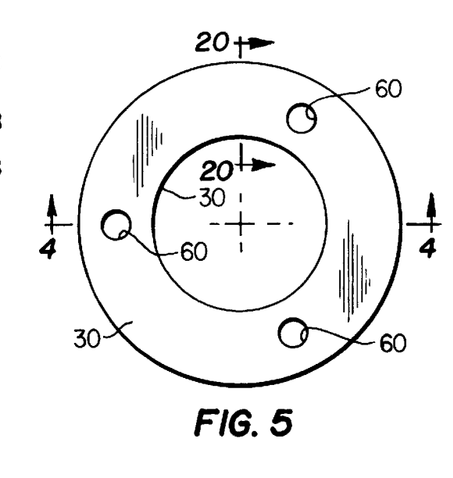
FIG. 5 is a top view of the housing of FIG. 1.

Referring now additionally to FIGS. 3–5, housing 12 has a cylindrical wall 20 of varying thickness defining a stepped inner surface 22, outer surface 24, lower annular surface 26, lower opening 28, upper annular surface 30, and upper opening 32. Wall 20 has a lower section 34 and an upper section 36. Lower section 34 has a thickness 38 and a lower inner surface 42 having a diameter 44. Lower opening 28 also has a diameter equal to diameter 44. The outer surface has an outer diameter 46.

In upper section 36, wall 20 protrudes inwardly to reduced diameter inner surface 48, and has an increased thickness 40.

The reduced diameter inner surface 48 and the upper opening 32 have a diameter 50 which is smaller than diameter 44 of the lower inner surface 42 and the lower opening 28. The transition between lower inner surface 42 and reduced diameter inner surface 48 forms a downward facing shoulder 52.

In upper section 36, and formed into reduced diameter inner surface 48, is located a drive ring groove 54, described in more detail below. In lower section 34, and formed into lower inner surface 42, is located a retainer ring groove 56, described in more detail below. Threads 58 are located along the exterior of housing 12 to allow housing 12 to be screwed into a threaded hole. Install tool holes 60 (only one is visible in FIG. 1, the others being visible in FIG. 5) are located in upper annular surface 30 for accepting the install tool, as described in more detail below.

Referring now to FIGS. 1–2 and 6–8, stud 14 has an elongate stem 68 with an upper stem surface 70 and a lower stem surface 72. Toward the lower end of stem 14 is a head 74. Stem 68 has a section with threads 76, and located below threads 76 a thread relief section 78 without threads. Thread relief section 78 is located between threads 76 and head 74. Threads 76 have a maximum diameter 82 which is smaller than the diameter 50 of the upper opening 32. Thread relief section 78 has a diameter 86 which is approximately the same as the minimum diameter 84 of threads 76.

Figure 6:
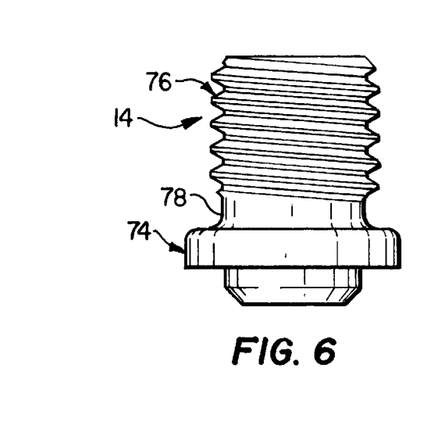
FIG. 6 is a side view of the cooperating member of FIG. 1.
Figure 7:
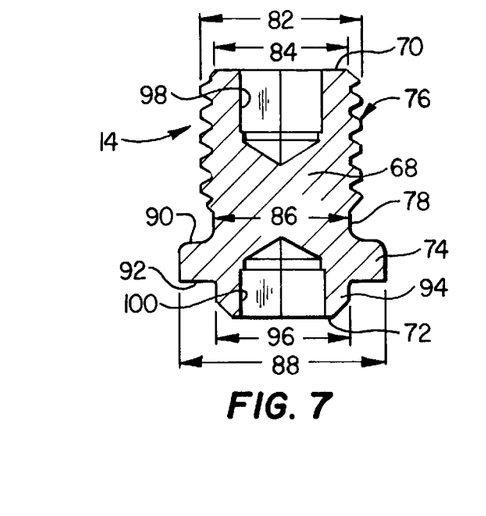
FIG. 7 is a cross-sectional view of the cooperating member of FIG. 6.
Figure 8:
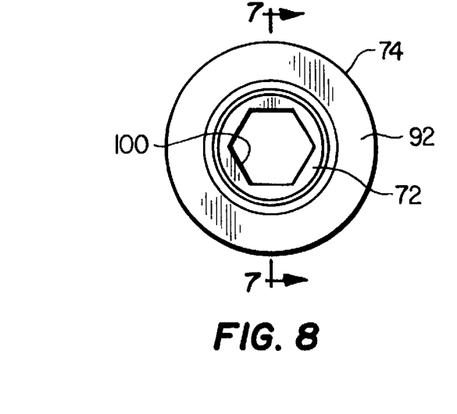
FIG. 8 is a bottom view of the cooperating member of FIG. 6.

Adjacent thread relief section 78 is head 74. Head 74 has an outer diameter 88 which is larger than the maximum diameter of threads 76, and larger than the diameter 50 of the upper opening 32, yet smaller than diameter 44 of the lower opening 28 and lower inner surface 42. The upper surface of head 74 which extends outwardly of thread relief section 78 defines an upward facing shoulder 90. The lower surface of head 74 defines a downward facing surface 92. Stem 68 extends below head 74 to define a lower stem section 94, which terminates in lower stem surface 72. Lower stem section has a diameter 96.

Located at each end of stud 14 are hexagonal recesses 98 and 100. Hexagonal recesses 98 and 100 are of the conventional type adapted to fit standard hex key wrenches. The hexagonal recesses 98 and 100 are used to apply torque to stud 14, as explained in more detail below.

Figure 9:
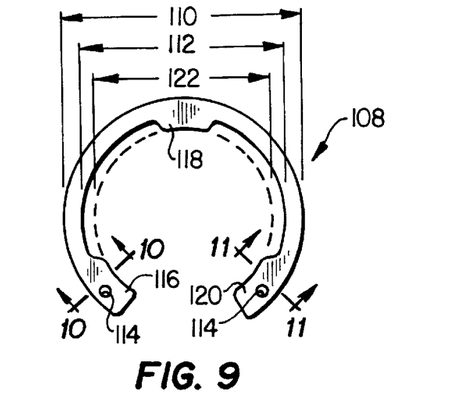
FIG. 9 is top view of the drive ring of FIG. 1.
Figure 20:
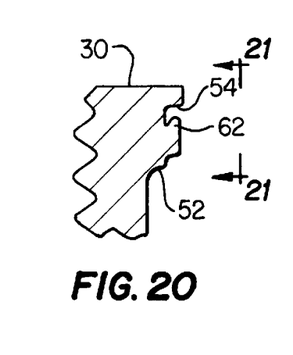
FIG. 20 is a partial cross sectional view taken along line 20—20 of FIG. 5, and showing the drive ring retaining crimp.
Figure 21:
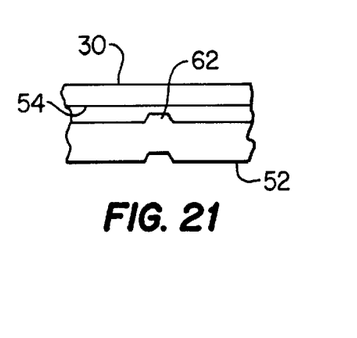
FIG. 21 is a view of the drive ring retaining crimp taken along line 21—21 of FIG. 20.

Referring now to FIGS. 1, 2, and 9, drive ring 108 is shown. Drive ring 108 is a thin, flat metal ring adapted to fit within drive ring groove 54 of housing 12. Drive ring 108 has outer diameter 110 slightly smaller than the outer diameter of the drive ring groove 54 of housing 12, and an inner diameter 112 which is slightly larger than the maximum diameter 82 of threads 76 of stud 14. Holes 114 in drive ring 108 facilitate the placement of drive ring 108 within drive ring groove 54. A drive ring retaining crimp 62 (see FIGS. 20 and 21) is formed into drive ring groove 54. The drive ring retaining crimp 62 can be formed either from the top or the bottom of drive ring groove 54. Drive ring 108 is placed within drive ring groove 54 so that crimp 62 is located in the open section of drive ring 108. The open section of drive ring 108 is wider than the width of crimp 62. This allows drive ring 108 to rotate slightly about the longitudinal axis of housing 12, but prevents it from spinning about this axis. If drive ring 108 were allowed to spin, it would loose its "driving" function.

Figure 10:
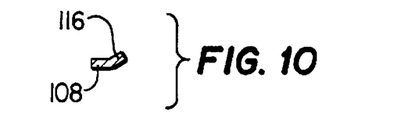
FIG. 10 is a cross-sectional view of the drive ring of FIG. 9 taken along line 10—10 of FIG. 9.
Figure 11:
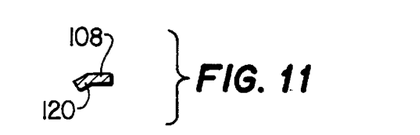
FIG. 11 is a cross-sectional view of the drive ring of FIG. 9 taken along line 11—11 of FIG. 9.

Protruding inwardly from the inner surface of drive ring 108 are three tangs: first tang 116, second tang 118, and third tang 120. Second tang 118 is flat and in the plane of drive ring 108. First tang 116 is bent upwards with respect to the plane of drive ring 108, and third tang 120 is bent downwards with respect to the plane of drive ring 108, as shown in detail in FIGS. 10 and 11. Tangs 116, 118, and 120 protrude inwardly to a diameter 122. Diameter 122 is larger than the minimum diameter 84 of threads 76 of stud 14, but smaller than the maximum diameter 82 of threads 76.

When drive ring 108 is placed in drive ring groove 54, the interaction of tangs 116, 118, and 120 and threads 76 of stud 14, allow stud 14 to be moved axially with respect to housing 12 by rotating, or screwing, stud 14. For example, by screwing stud 14 in a counter-clockwise direction (as seen from above fastener 12), stud 14 is moved upward with respect to housing 12 (see the position of stud 14 in FIG. 2). On the other hand, if stud 14 is screwed clockwise (as seen from above fastener 12) stud 14 is moved downward with respect to housing 12 (see the position of stud 14 in FIG. 1).

Figure 12:
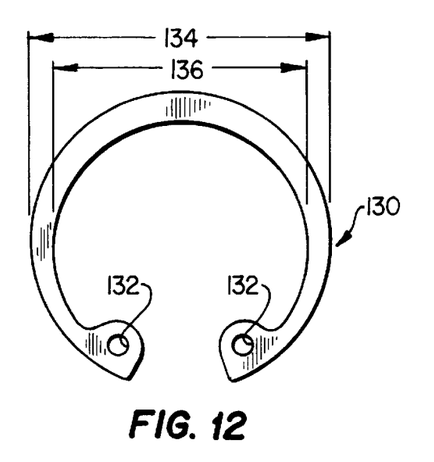
FIG. 12 is a top view of the retainer ring of the apparatus of FIG. 1.

Referring now to FIGS. 1, 2, and 12, retainer ring 130 is shown. Retainer ring 130 is a flat, thin metal ring adapted to fit within retainer ring groove 56 in the housing 12. Holes 132 facilitate the placement of retainer ring 130 within retainer ring groove 56. In a not-installed position, retainer ring 130 has an outer diameter 134 slightly larger than the outer diameter of retainer ring groove 56. However, when retainer ring 130 is placed in retainer ring groove 56, its outer diameter is reduced to just smaller than the outer diameter or retainer ring groove 56. Inner diameter 136 of retainer ring 130 is smaller than the diameter 88 of head 74 of stud 14. Thus, when stud 14 is located within housing 12, retainer ring 130 serves to retain stud 114 within housing 12 even when stud 14 is in the fully dis-engaged, or retracted, position in which the drive ring 108 does not keep stud 14 in place within housing 12.

Figure 13:
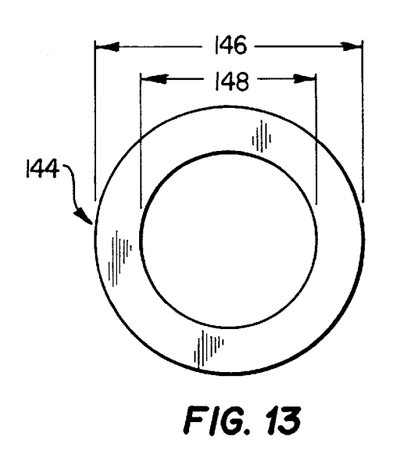
FIG. 13 is a top view of the spring retainer of the apparatus of FIG. 1.

Referring now to FIGS. 1, 2, and 13, spring retainer 144 is shown. Spring retainer 144 is a thin flat metal ring with an outer diameter 146 slightly smaller than the diameter 44 of the lower inner surface 42 and larger than the inner diameter 136 of retainer ring 130. Spring retainer 144 has an inner diameter 148 slightly larger than diameter 96 of the lower stem section 94 of stud 14. When fastener 10 is assembled, spring retainer 144 is located immediately above retainer ring 130.

Referring now to FIGS. 1 and 2, when fastener 10 is assembled, a spring 156 is placed between spring retainer 144 and the downward facing surface 92 of stud 14. Spring 156 acts to bias stud 14 in an upward direction, so that threads 76 are biased into engagement with drive ring 108. When stud 14 is in the fully dis-engaged, or retracted, position, spring 156 is in its most compressed state (see FIG. 1). When stud 14 is in the fully engaged, or extended, position, spring 156 is in its least compressed state (see FIG. 2).

Figure 14:
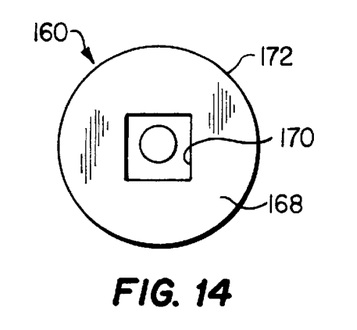
FIG. 14 is a top view of the install tool for installing the apparatus of FIG. 1.
Figure 15:
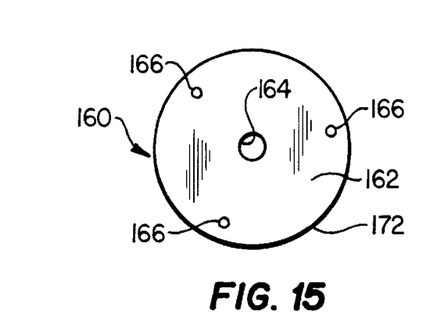
FIG. 15 is a bottom view of the install tool of FIG. 14.
Figure 16A:
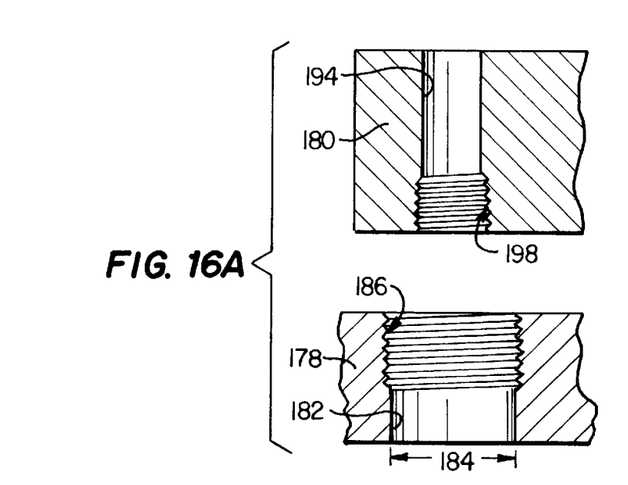
FIGS. 16A–16D are a sequence of cross-sectional views showing the operation of the apparatus of FIG. 1 with respect to two objects having a first configuration.
Figure 16B:
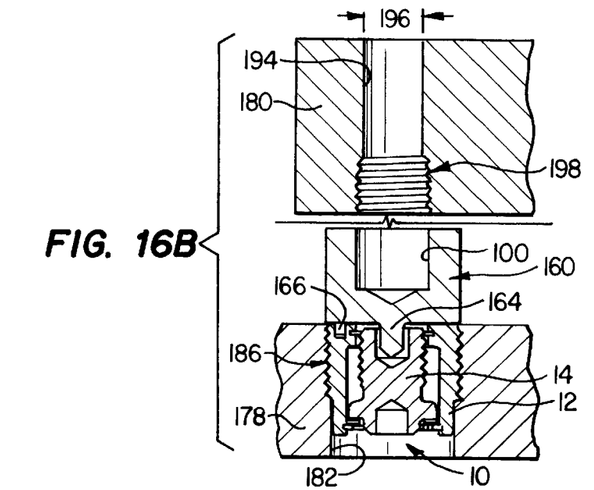
Figure 16C:
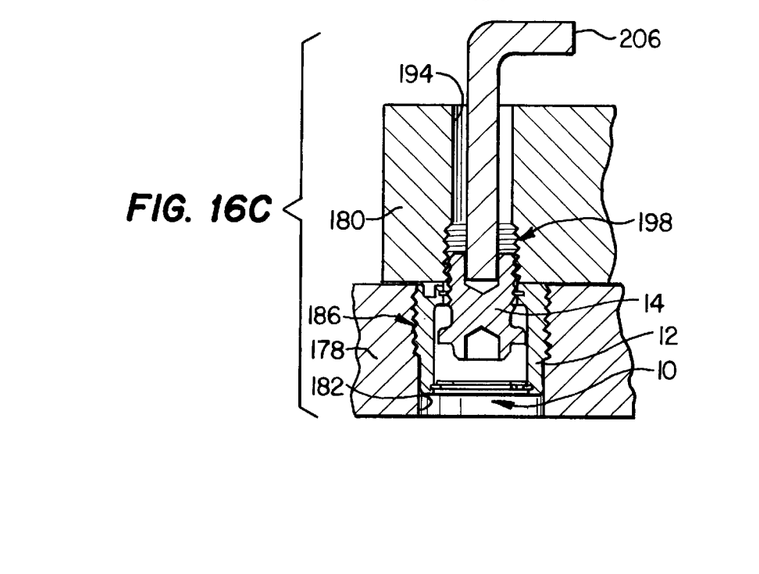
Figure 16D:
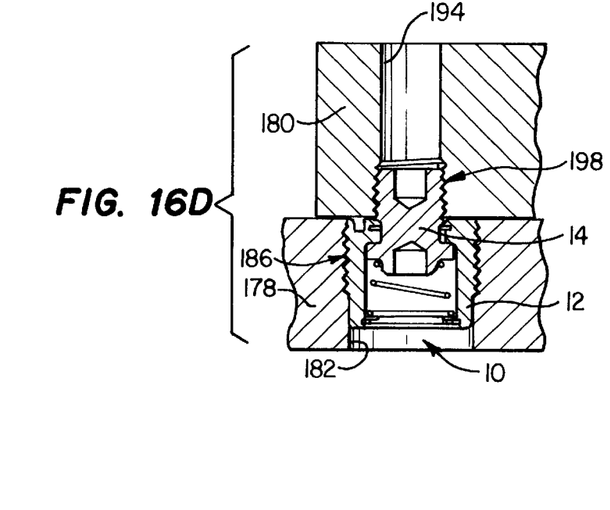

Referring now primarily to FIGS. 14 and 15, but also to FIGS. 16B–16D, a fastener install tool 160 is shown. Install tool 160 is a generally cylindrical tool of diameter approximately equal to the outer diameter of housing 12. In the middle of lower surface 162 is located a guiding pin 164. Guiding pin 164 is of a sufficiently small diameter so that it fits loosely inside hexagonal recess 98. Guiding pin 164 serves as a rough guide to guide the install tool 160 to approximately the correct position; however, guiding pin 164 is not necessary and the install tool 160 can function without it. Also on lower surface 162 are located three drive pins 166. Drive pins 166 register with install tool holes 60 located on the upper annular surface 30 of housing 12. Located on the upper surface 168 of install tool 160 is located a square recess 170. Square recess 170 is configured to accept a standard socket wrench drive pin, and is used to tighten housing 12 into the receiving object. The outer cylindrical surface 172 of install tool 160 is knurled to facilitate the application of torque to install tool 160 by hand.

Referring now to FIGS. 16A–16D, the use of fastener 10 is shown. Referring first primarily to FIG. 16A, before installing fastener 10, the first and second objects being fastened, 178 and 180 respectively, must be prepared. A hole 182 of diameter 184 is drilled into the first object 178. Diameter 184 is slightly larger than outer diameter 46 of housing 12. Hole 182 is then tapped to create threads 186, whose minor diameter is approximately equal to diameter 184. Threads 186 are configured to mate with threads 58 on housing 12.

A hole 194 is then drilled into second object 180 to register with hole 182 in first object 178. Hole 194 has a diameter 196 slightly larger than the minimum diameter 84 of threads 76 of stud 14. Hole 194 is then tapped to create threads 198, whose minor diameter is approximately equal to diameter 196. Threads 198 are configured to mate with threads 76 on stud 14.

Referring next to FIGS. 16B–16D, but primarily to FIG. 16B, the installation of fastener 10 is shown. Install tool 160 is placed over housing 12 so that drive pins 166 of install tool 160 are inserted into install tool holes 60 of housing 12. Install tool 160 is then used to tighten fastener 10 by hand. A wrench is then used to apply torque to the install tool 160 and thus securely tighten housing 12 of fastener 10 into the first object 178.

The second object 180 is then lowered toward the first object 178 so that hole 194 of second object 180 registers with hole 182 of first object 178. A hex key 206 is inserted either through hole 194 or hole 182 and into either of hexagonal recesses 98 and 100. If the hex key 206 is inserted through hole 194 and into hexagonal recess 98 (as shown in FIG. 16C), the hex key is then rotated counter-clockwise (as seen from above housing 12). As shown in more detail in FIGS. 1 and 2, spring 156 biases stud 14 so that threads 76 engage drive ring 108. As hex key 206 is rotated, drive ring 108 forces stud 14 upward into engagement with threads 198 in the second object 180. Once threads 76 of stud 14 engage threads 198 of the second object 180, as stud 14 is rotated by hex key 206 both the drive ring 108 and threads 198 force stud 14 upward into the second object 180.

FIG. 16C shows the stud in an intermediate position between the fully dis-engaged (or retracted) position shown in FIGS. 1 and 16B, and the fully engaged (or extended) position shown in FIGS. 2 and 16D. When stud 14 reaches the fully engaged position, drive ring 108 ceases to engage threads 76 of stud 14, and instead is disposed about the thread relief section 78. Also, the upward facing shoulder 90 of stud 14 comes into contact with the downward facing shoulder 52 of housing 12. As hex key 206 tightens stud 14, the interaction of threads 76 and threads 198 tends to pull stud 14 upward and the second object 180 downward, increasing the force between upward facing shoulder 90 and downward facing shoulder 52, and tightening the second object to the first object. To remove fastener 10, the installation process is reversed.

In FIG. 16C, the fastening of fastener 10 is performed by inserting hex key 206 into hexagonal recess 98. However, fastener 10 can also be installed by inserting hex key 206 into hexagonal recess 100. Because holes 182 and 194 extend through the full thickness of the first and second objects 178, 180, respectively, hex key 206 can be inserted from either direction.

Figure 17:
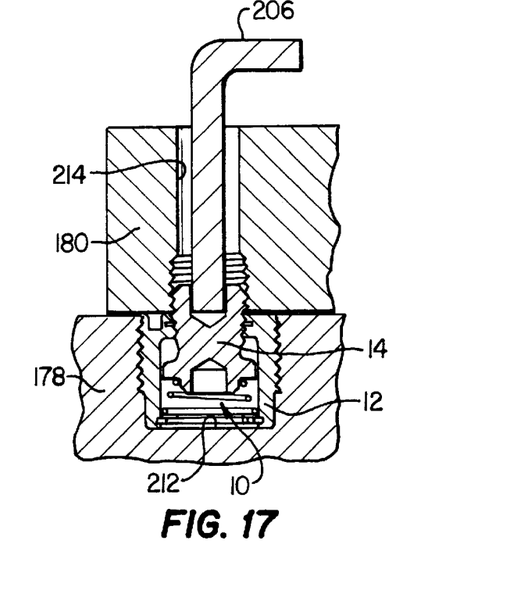
FIG. 17 is a cross-sectional view showing the apparatus of FIG. 1 being used to releasably fasten two objects having a second configuration.
Figure 18:
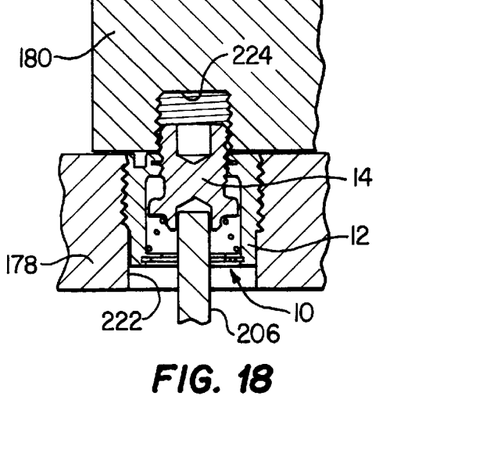
FIG. 18 is a cross-sectional view showing the apparatus of FIG. 1 being used to releasably fasten two objects having a third configuration.

As shown in FIGS. 17 and 18, it is not necessary to have holes extending through the entire thickness of both the first and second objects 178, 180. As shown in FIG. 17, hole 212 is a blind hole that does not extend through the thickness of the first object 178. Hole 214 in the second object 180 is the same as hole 194 in FIG. 16A–16C. The operation of the fastener 10 in the configuration of FIG. 17 is identical to the operation fastener 10 in the configuration of FIGS. 16A–16D, except that in the configuration of FIG. 17 hex key 206 must be inserted through hole 214 and into hexagonal recess 98.

In FIG. 18, fastener 10 is shown in use in a different configuration. In FIG. 18, hole 224 in the second object 180 is a blind hole and does not extend through the thickness of the second object 180. Hole 222 in the first object 178, on the other hand, extends through the thickness of the first object 178, much like hole 182 in FIGS. 16A–16D. Again, the operation of the fastener 10 in the configuration of FIG. 18 is identical to the operation of fastener 10 in the configuration of FIGS. 16A–16D, except that in the configuration of FIG. 18 hex key 206 must be inserted through hole 222 and into hexagonal recess 100.

Figure 19A:
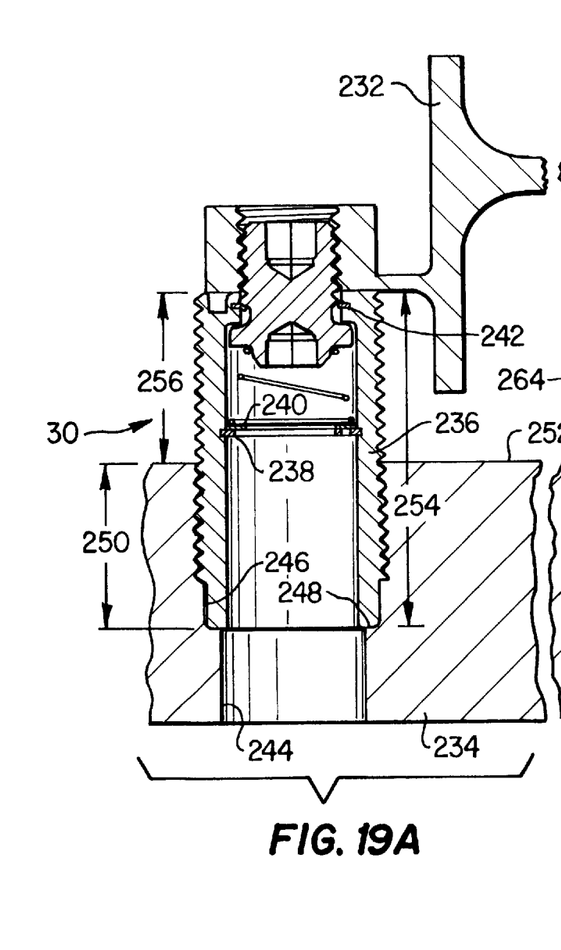
FIGS. 19A–19C are cross-sectional views showing alternative embodiments and uses of the apparatus of the present invention.
Figure 19B:
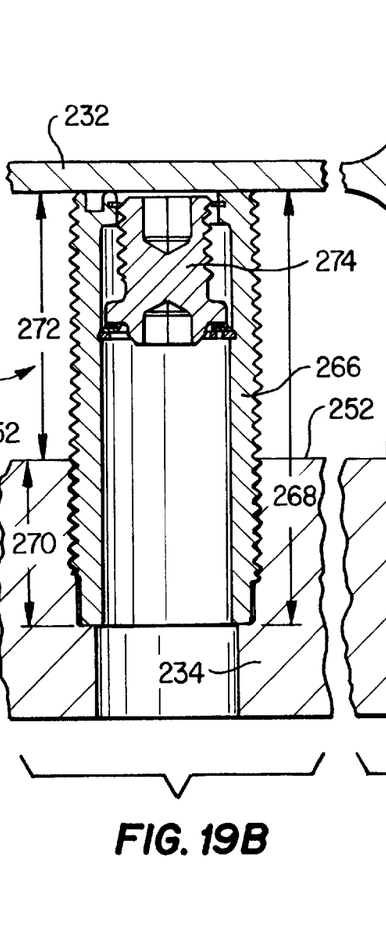
Figure 19C:
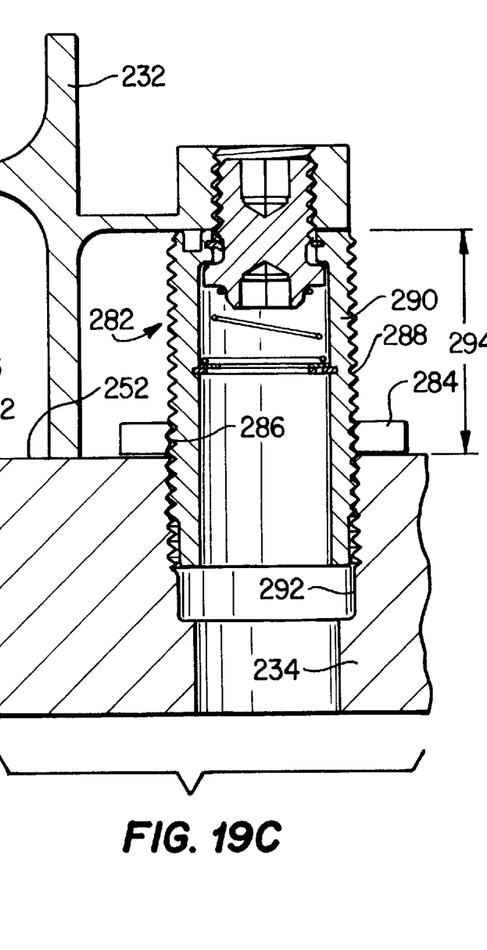

FIGS. 19A–19C show alternative embodiments and uses of the apparatus of the present invention which are particularly helpful in fixturing applications. Referring first to FIG. 19A, fastener 230 is shown. Fastener 230 is fastening machined part 232 to mill fixture 234. Housing 236 is similar to housing 12, except that it is longer, with the lower portion of the housing having been extended, and has a thicker wall section. Retainer ring 238 and spring retainer 240 are located with respect to drive ring 242 in a fashion similar to the corresponding components of fastener 10 of FIG. 1.

Mill fixture 234 has two holes 244 and 246. Hole 246 is similar to hole 182 of FIGS. 16A–16D and is adapted to receive housing 236. Hole 244 is smaller in diameter than hole 246 and thus of diameter smaller than the outer surface of housing 236. The transition between holes 244 and 246 of differing diameters forms a shoulder 248. When housing 236 is screwed into hole 246, the bottom of housing 236 rests on shoulder 248. Because depth 250 from mill fixture surface 252 to shoulder 248 can be accurately selected, and because the length 254 of housing 236 can also be accurately selected, the distance 256 from mill fixture surface 252 to the upper annular surface of housing 236 can also be accurately selected. This allows machined part 232 to be accurately located for the machining operation.

Referring next to FIG. 19B, fastener 264 is shown. Fastener 264 is similar to fastener 230 of FIG. 19A, but has a housing 266 of length 268. Because depth 270 can be appropriately selected and is thus known, distance 272 can be accurately selected. By leaving stud 274 in the disengaged position (in which stud 274 is fully retracted within housing 266) the upper annular surface of housing 266 can serve as an accurately positioned surface to support a large machined part having a large span and/or a small thickness, so as to reduce flex in the machined part during the milling operation.

Referring next to FIG. 19C, fastener 282 and jam nut 284 are shown. Jam nut 284 has threads 286 which cooperate with threads 288 of housing 290. By screwing housing 290 only partially into hole 292, and then tightening jam nut 284 down toward the mill fixture surface, the upper annular surface of housing 290 is positioned a selected distance 294 from the mill fixture surface 252. This allows accurate positioning of milled part 232 with respect to the mill fixture 234.

The embodiments of FIGS. 19A–19C show different ways of accurately positioning milled part 232 with respect to mill fixture 234. The embodiments of FIGS. 19A and 19C serve both a positioning function and a fastening function, while the embodiment of FIG. 19B shows only a positioning function. Clearly, however, if the milled part 232 allowed, the embodiment of FIG. 19B could also be used in a fastening application, in which case it would function like the embodiment of FIG. 19A.

Figure 22:
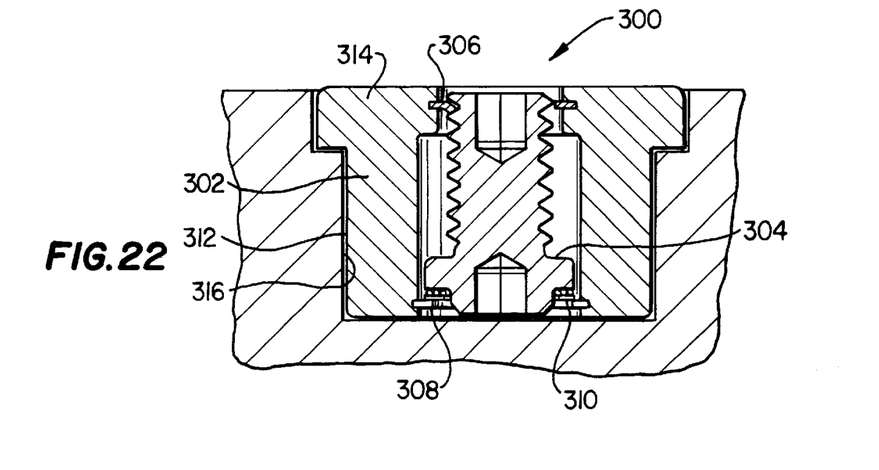
FIG. 22 is a cross-sectional view of an alternative embodiment of the present invention.

FIG. 2 shows yet another embodiment of the present invention which is particularly useful with certain composite materials. One such application would be in resin transfer molds. The fastener 300 has a housing 302 and a stud 304. Stud 304 is identical to stud 14 of FIG. 1. Fastener 300 has a drive ring 306 that engages the threads of stud 304, a retainer ring 308, and a spring retainer 310, amongst other similar components to fastener 10 of FIG. 1. The distinguishing features of fastener 300 from fastener 10 are the threadless outer surface 312 of housing 302, and the flange 314 protruding from outer surface 312. The diameter of the outer surface 312 is such that fastener 300 can be press fit into hole 316.

While the invention has been particularly shown and described with reference to a preferred embodiment, it will be understood by those skilled in the art that various changes in form and detail may be made therein without departing from the spirit and scope of the invention.

What is claimed is:

1. A fastener device for releasably fastening a first and second object, the fastener device comprising:
   a unitary housing having an annular wall and opposing first and second ends, the annular wall having threads on an exterior thereof adated for threadedly connecting to a tapped hole in the first object, the annular wall defining an opening at each opposing end;
   a housing stop shoulder extending radially inward from the cylindrical housing;
   a drive ring groove formed in the circumference of an interior surface of the housing at the first end of the housing;
   a drive ring located within the drive ring groove and extending inwardly of the interior surface of the housing;
   a stud extending in the axial direction of the housing and having opposing first and second end-portions, the stud being movable between an engaged position in which the stud is adapted to engage the second object and a dis-engaged position in which the stud is not adapted to engage the second object;
   the stud having an enlarged portion toward the first end-portion of the stud and having formed therein a stud stop shoulder, the stud stop shoulder being opposed to the housing stop shoulder and adapted to mate therewith when the stud is in the engaged position;
   the stud being sized and positioned within the housing such that the enlarged portion is located completely within the housing both when the stud is in the engaged position and when the stud is in the dis-engaged position;
   stud threads located toward the second end-portion of the stud wherein the stud threads are adapted to engage the second object and the drive ring;
   a first drive recess located toward the first end-portion of the stud;
   a second drive recess located toward the second end-portion of the stud;
   a retainer ring groove formed in the circumference of an interior surface of the housing at the second end of the housing;
   a retainer ring located within the retainer ring groove and extending radially inward from the interior surface of the housing and adapted to retain the stud within the housing when the stud is in the dis-engaged position and the housing is not threadedly connected to the tapped hole in the first object.

2. The apparatus according to claim 1 further comprising:
   a spring located between the first end-portion of the stud and the retainer ring, wherein the spring biases the stud toward the engaged position.

3. The apparatus according to claim 1 further comprising:
   install tool holes located on the first end of the housing;
   an install tool having a body and pins extending from the body and adapted to register with the install tool holes of the housing, wherein the install tool facilitates installation of the fastener.

4. The apparatus according to claim 1 further comprising:
   a crimped zone within the drive ring groove that prevents the drive ring from completing a full revolution.

5. A fastener device for releasably fastening a first and second object, the fastener device comprising:
   a unitary housing having an annular wall and opposing first and second ends, the annular wall having a smooth cylindrical exterior surface adapted to be press fit within a hole in the first object, the annular wall defining an opening at each opposing end;
   a housing stop shoulder extending radially inward from the cylindrical housing;
   a drive ring groove formed in the circumference of an interior surface of the housing at the first end of the housing;
   a drive ring located within the drive ring groove and extending inwardly of the interior surface of the housing;
   a stud extending in the axial direction of the housing and having opposing first and second end-portions, the stud being movable between an engaged position in which the stud is adapted to engage the second object and a dis-engaged position in which the stud is not adapted to engage the second object;
   the stud having an enlarged portion toward the first end-portion of the stud and having formed therein a stud stop shoulder, the stud stop shoulder being opposed to the housing stop shoulder and adapted to mate therewith when the stud is in the engaged position;
   the stud being sized and positioned within the housing such that the enlarged portion is located completely within the housing both when the stud is in the engaged position and when the stud is in the dis-engaged position;
   stud threads located toward the second end-portion of the stud wherein the stud threads are adapted to engage the second object and the drive ring;
   at least one drive surface located on the stud;
   a retainer ring groove formed in the circumference of an interior surface of the housing at the second end of the housing;
   a retainer ring located within the retainer ring groove and extending radially inward from the interior surface of the housing and adapted to retain the stud within the housing when the stud is in the dis-engaged position.

* * * * *